United States Patent

Trofimenko et al.

(10) Patent No.: US 9,153,824 B2
(45) Date of Patent: Oct. 6, 2015

(54) FUNCTIONAL LAYER FOR HIGH-TEMPERATURE FUEL CELLS AND METHOD FOR PRODUCTION

(75) Inventors: Nikolai Trofimenko, Dresden (DE); Sindy Mosch, Dresden (DE); Viktar Sauchuk, Dresden (DE); Karin Lucke, Dresden (DE); Mihails Kusnezoff, Dresden (DE)

(73) Assignee: Fraunhofer-Gesellschaft zur Foerderung der Angewandten Forschung E.V., München (DE)

( * ) Notice: Subject to any disclaimer, the term of this patent is extended or adjusted under 35 U.S.C. 154(b) by 811 days.

(21) Appl. No.: 12/682,734

(22) PCT Filed: Nov. 5, 2008

(86) PCT No.: PCT/DE2008/001860
§ 371 (c)(1),
(2), (4) Date: Jul. 14, 2010

(87) PCT Pub. No.: WO2009/059601
PCT Pub. Date: May 14, 2009

(65) Prior Publication Data
US 2011/0039191 A1    Feb. 17, 2011

(30) Foreign Application Priority Data
Nov. 5, 2007 (DE) .......... 10 2007 053 075

(51) Int. Cl.
*H01M 8/02* (2006.01)
*C04B 35/01* (2006.01)
*H01M 8/24* (2006.01)
*H01M 8/12* (2006.01)

(52) U.S. Cl.
CPC ............. *H01M 8/0217* (2013.01); *C04B 35/01* (2013.01); *C04B 35/016* (2013.01); *H01M 8/0226* (2013.01); *C04B 2235/3213* (2013.01); *C04B 2235/3227* (2013.01); *C04B 2235/3262* (2013.01); *C04B 2235/3268* (2013.01); *C04B 2235/3275* (2013.01); *C04B 2235/3298* (2013.01); *C04B 2235/5436* (2013.01); *C04B 2235/768* (2013.01); *C04B 2235/80* (2013.01); *H01M 8/2425* (2013.01); *H01M 2008/1293* (2013.01); *Y02E 60/50* (2013.01); *Y02E 60/525* (2013.01)

(58) Field of Classification Search
CPC ................ H01M 2008/1293; H01M 8/0217; H01M 8/0226; H01M 8/2425; C04B 2235/768
USPC .................................... 429/400–535
See application file for complete search history.

(56) References Cited

U.S. PATENT DOCUMENTS

| 5,306,411 A | 4/1994 | Mazanec et al. |
| 2004/0047789 A1 | 3/2004 | Tietz et al. |
| 2007/0231666 A1 * | 10/2007 | Wang et al. .................. 429/38 |

FOREIGN PATENT DOCUMENTS

| DE | 93 04 984 | 6/1993 |
| DE | 199 41 282 | 3/2001 |

(Continued)

*Primary Examiner* — Christopher Schatz
(74) *Attorney, Agent, or Firm* — Fay Kaplun & Marcin, LLP

(57) ABSTRACT

Described is a functional layer for high-temperature fuel cells and to a method for the production of functional layers. The functional layer is in particular a low-sintering, electrically conductive, ceramic layer which is formed between an interconnector and a cathode of a fuel cell. The functional layer is formed from a material which has at least two phases. A first phase is a perovskite ceramic material containing bismuth-cobalt and a second phase is a bismuth manganite and/or bismuth cobaltite (Bi—Mn—Co—O).

7 Claims, 4 Drawing Sheets

(56) References Cited

FOREIGN PATENT DOCUMENTS

| DE | 100 59 280 | 6/2002 |
|----|------------|--------|
| EP | 1 337 496 | 8/2003 |
| JP | 2003-123772 | 4/2003 |
| JP | 2003-123773 | 4/2003 |
| JP | 2004-513867 | 5/2004 |
| JP | 2004-533400 | 11/2004 |
| JP | 2005 166510 | 6/2005 |
| JP | 2007-220655 | 8/2007 |
| JP | 2007-529855 | 10/2007 |

* cited by examiner

FUNCTIONAL LAYER FOR HIGH-TEMPERATURE FUEL CELLS AND METHOD FOR PRODUCTION

FIELD OF INVENTION

The invention relates to a functional layer for high-temperature fuel cells and to a method for the production of functional layers. The functional layer is in particular a low-sintering, electrically conductive, ceramic layer which is formed between an interconnector and a cathode of a fuel cell.

BACKGROUND INFORMATION

High-temperature fuel cells are developed for operating temperatures between 650° C. and 1000° C. Different materials are used in dependence on the development goal. Cathodes of an SOFC fuel cell are known which are made of ceramic material. Interconnectors are also known which are made of metal.

A functional layer is to be understood as a layer which has to satisfy a defined function. A contact layer which takes over the electrically conductive function between the cathode and the interconnector within the fuel cell represents an example for such a functional layer. This functional layer on the one hand ensures an electrical contact between the two components with which this layer forms a connection at both sides with material continuity to both components as a consequence of a joining process.

Previously used materials for a functional layer between the cathode and the interconnector made from lanthanum manganite or lanthanum cobaltite are less sinter-active at temperatures of 950° C. or below, i.e. the required diffusion processes are too low to realize a good electrical contact and sufficient adhesion to boundary layers. It is also disadvantageous that the layers which form from these materials are very porous and can thereby not prevent a corrosion of the interconnector by air in the cathode space.

In accordance with DE 19710345 C1, a paste, in which a first phase is made of glass or of a glass ceramic material and a second phase is electrically conductive, is provided for the realization of the connection between the cathode and the interconnector. The paste as a rule comprises a similar material or the same material as the cathode. This paste is first applied to the interconnector. The interconnector and the adjacent cathode are subsequently heated with the paste to a temperature of up to 900° C. Temperatures above 900° C. are, however, damaging in the long term for the material of the interconnector since it is usually formed from a steel.

It is also customary to use a glass solder for the sealing of fuel cells. A glass solder used for this purpose likewise cannot withstand temperatures of 900° C., however.

It is also disadvantageous with this known paste that it is only electrically conductive subsequent to a sintering. As a rule it does not sinter or sinters too little at 900° C. The paste therefore has low electrical conductivity in the operation of a high-temperature fuel cell.

As is described in DE 19749004 C1, an electrically conductive connection was realized between a ceramic component and a metallic component with a sintered, electrically conductive paste between both components. This connection is established in that the paste is applied to a ceramic component (e.g. a ceramic cathode) at least at the points at which the second component (e.g. webs of an interconnector) should contact the ceramic surface. With the electrical conductivity of the paste being able to be improved by sintering. The surface with the sintered paste is ground until a planar surface is produced for the suitable contacting. If the component is an electrode-electrolyte unit with a thin cathode, the cathode is not abraded by the grinding due to the selected thickness of the paste.

The powder can be formed from a glass-metal combination or from a ceramic powder depending on the sintering temperature. For lower sintering temperatures (<800° C.), the paste, on the one hand, contains a powder made from the starting materials for glass and, on the other hand, pulverized silver in a volume ratio of 1:1. Instead of the silver, a silver oxide powder and/or a silver alloy in powder form can be used, in each case also together with silver powder. Since silver is very noble, it can even be used for contact layers in cathode spaces (spaces in which the cathodes are located) of a fuel cell between the interconnector and the cathode although an oxidizing atmosphere is present there due to the supplied air.

The contacts known from DE 19749004 generally have the following disadvantages:

Due to the high vapor pressure of silver at T>800° C., the contact layers on the basis of a silver-glass ceramic material do not have long-term stability.

It is also disadvantageous that the layers which are formed from such pastes cannot prevent poisoning the cathode by Cr evaporation from the interconnector due to the air flowing through the cathode space.

In accordance with DE 19941282 C1, a mixture is used for the realization of an electrically conductive contact between an interconnector and a cathode of a fuel cell which comprises cuprates, CuO/cuprate compounds or silver/cuprate compounds and forms melts or part melts in the temperature range from 800-1400° C. Compounds having the following composition are preferably used as cuprates: $(La,Sr)_2CuO_{4-x}$, $(La,Sr)CuO_{2.4+x}$, $YBa_2Cu_3O_{7-x}$, $Bi_2Sr_2Ca_2Cu_2O_{8+x}$ or also $Bi_2(Sr,Ca)_2CuO_{6+x}$ or $(Bi,Pb)_2Sr_2Ca_2Cu_3O_{10+x}$. In addition, mixtures of CuO and cuprates or of Ag and cuprates are also suitable as materials for the contact. In this respect, the proportions of CuO in the mixture can amount to up to 30% by weight or of Ag up to 10% by weight. The contacts known from DE 19941282 have the following disadvantages, however:

The contact layers on the basis of cuprate compounds have no long-term stability due to the high vapor pressure of the copper at T>850° C. $(La,Sr)CuO_{2.4+x}$, for example, continuously shows phase conversions from the perovskite structure into the $K_2NiF_4$ structure after the sintering at temperatures >900° C. This phase conversion can have a very negative influence on the layer properties, which has a particular effect on a thermal cyclization. The $K_2NiF_4$ structure has a lower thermal coefficient of expansion, which results in incompatibilities with the other cell layers.

In addition, mechanical influences such as vibrations, pressure changes and tensions can also not always be compensated with the layers or a sufficiently large resistance against such influences cannot be achieved and the electrically conductive connection is also again impaired in an unwanted manner.

It is also disadvantageous that the layers which form from such pastes cannot ensure protection of the cathode from Cr evaporation from an interconnector through the air flowing through the cathode space.

SUMMARY OF INVENTION

The present invention relates to a

It is therefore the object of the invention to provide a functional layer for high-temperature fuel cells improved to this extent which can form an electrically conductive layer between a cathode and an interconnector at temperatures in the range from 750-950° C. as a consequence of a joining process and which ensures increased electrical conductivity in the long term at increased operating temperatures up to 950° C.

The functional layer in accordance with the invention is an electrically conductive layer which is manufactured from a powder mixture in which perovskite ceramic material containing cobalt and bismuth oxide are contained.

The electrical functional layer in accordance with the invention has a high electric conductivity and can form easily adhering layers on an interconnector or on a cathode with a heat treatment at temperatures between 700 and 1000° C., preferably between 750° C. to 950° C.

Perovskites containing cobalt are used as the starting material for the functional layer. They include ones with the composition $Ln_{1-x-z}A_xM_{1-y}Co_yO_{3-\delta}$ where $x \leq 0.35$, $0 \leq z \leq 0.05$, $0.1 \leq y \leq 0.6$, Ln=rare earths, A=alkaline earth and M=transition metals. It has surprisingly been found that an electric functional layer in accordance with the invention can be manufactured only by the reaction with perovskite containing cobalt.

In addition, perovskites containing bismuth-cobalt $Ln_{1-x-z}Bi_zA_xM_{1-y}Co_yO_{3-d}$ where $x=0.35$, $0=z=0.05$, $0.1=y=0.6$, Ln =rare earths, A=alkaline earth, M=transition metals and Bi—Mn—Co—O oxides on a bismuth manganite and/or bismuth cobaltite base are suitable for the manufacture of electric functional layers in accordance with the invention. They can be manufactured in situ on a heat treatment from a powder mixture in which perovskite containing cobalt and bismuth oxide are contained.

In this respect, the portions of perovskites containing cobalt in the mixture can amount to up to 90% by volume and the portion of the second powder ($B_2O_3$) can amount to up to 10% by volume.

$Bi_2O_3$ and the perovskite containing cobalt react by a thermal treatment in the temperature range between 700° to 1000° C. while forming perovskite containing bismuth-cobalt with the composition $(Ln_{1-x-z}Bi_zA_xM_{1-y}Co_yO_{3-\delta}$ where $x \leq 0.35$, $0 \leq z \leq 0.05$, $0.1 \leq y \leq 0.6$, Ln=rare earths, A=alkaline earth, M=transition metals) as a first phase and Bi—Mn—Co—O oxide as a second phase.

The two phases should be present homogeneously distributed in the functional layer material. In this respect, they can realize a contact with material continuity between the cathode, the functional layer and the interconnector.

The first phase can be contained in the material with a portion of 90 to 98% by volume and the second phase with a portion of 2 to 10% by volume.

The material from which the functional layer is formed is formed in situ, has the two phases, has good electric conductivity and has a considerably improved sintering capability in comparison with conventional perovskites.

The electric conductivity should reach at least 10 S/cm, preferably at least 30 S/cm at a normal operating temperature of high-temperature fuel cells, that is, also above 700° C.

An improved sintering capability in this respect means that the sintering starts in the region from 700° C. and is thus considerably below 1000° C. A liquid phase sintering can thus be achieved. Desired temperatures can be selected in the range between 700° C. and 900° C. by suitable variation in the composition and in the portions of the starting materials. During the heat treatment, in which a joining with material continuity can also be achieved, due to the good sintering capability, the shrinkage of the forming functional layer can be adapted very easily to the shrinkage of a glass ceramic material/glass solder to be sintered simultaneously and which can be used for the sealing of the gas spaces between the anode and the cathode of a high-temperature fuel cell. Glass ceramic materials suitable for this purpose are known from the prior art.

An advantage of the functional layer in accordance with the invention comprises the fact that it is not only able to form a connection with good electric conductivity and tight adhesion between the interconnector and the cathode, but rather also simultaneously protects the cathode from chromium contamination.

The second oxidic phase Bi—Mn—Co—O reacts at the mentioned high temperatures and with the present oxidizing operating atmosphere with the released oxide compounds containing chromium from the interconnector to a Bi—Mn—Co—Cr—O phase and thus ensures additional protection against volatile chromium species based on the so-called getter effect. A poisoning of the cathode or of the boundary surface cathode-electrolyte by chromium deposition can thereby be effectively prevented.

A functional layer formed at or between the electrically conductive elements to be contacted (cathode and interconnector) should have a thickness up to 800 μm, preferably at least 200 μm, to be able to ensure the desired long-term protection with simultaneous sufficiently high electric conductivity.

An electric functional layer in accordance with the invention can have been formed areally in the form of webs on the corresponding surface of the cathode and/or on the surface of an interconnector facing into the interior of the fuel cell.

On the manufacture of an electric functional layer for high-temperature fuel cells in accordance with the invention, it is possible to proceed so that a mixture in which perovskite containing cobalt and $Bi_2O_3$ are contained is applied to elements to be electrically conductively connected to one another or also between such electrically conductive elements. With a desired joining with material continuity, an adhesively tight diffusion compound can also be formed at the boundary surfaces of the electrically conductive elements to be contacted to one another.

As already indicated, both components can be used in powder form with a mean particle size $d_{50}$ of the powders in the range 1 to 5 μm, with it being favorable to mix them jointly together with a binding agent and optionally a suitable solvent such as water and/or an organic solvent so that a viscous mass which is formed with the powder mixture and a liquid can be manufactured with a pasty consistency. The mixture can be applied in this pasty form. In this respect, an application can take place by screen printing technology, dispenser technology or by rolling on. Alternatively to this, a wet spray process (wet powder spraying) can also be used. A mixture with a correspondingly suitable consistency can, however, also be applied in the wet powder spraying process.

Permanent and effective protection of the cathode from chromium contamination can be achieved with the solution in accordance with the invention at the elevated temperatures present within the fuel cell in its operation and under the effect of air and an increase in the electrical resistance can be avoided. Furthermore, the electrocatalytic activity of a high-temperature fuel cell can be improved by a correspondingly achievable increase in the active cathode surface.

As already indicated, an increased adhesion of the contact can be achieved by the manufactured functional layer, which ensures a permanently sufficiently high electric conductivity in thermal cycles which occur.

The invention will be explained in more detail by way of example in the following without the subject of the invention being limited thereby.

BRIEF DESCRIPTION OF DRAWINGS

There are shown.

DETAILED DESCRIPTION

An embodiment for the manufacture of an electrically conductive functional layer between the cathode and the interconnector of a high-temperature fuel cell will be described in the following.

$La_{0.79}Sr_{0.2}Mn_{0.5}Co_{0.5}O_{3-x}$ and $Bi_2O_3$ were used as the starting materials. In this respect, 50 g of the perovskite powder with the composition $La_{0.79}Sr_{0.2}Mn_{0.5}Co_{0.5}O_{3-x}$ with a mean particle size between 1.5 to 3.5 µm was mixed with 5.55 g $Bi_2O_3$ in an ethanolic solution and subsequently homogenized on a roller bench or a planetary ball mill. The homogenized powder mixture was dried and screened. The screened powder mixture had a solvent added which contained terpineol and to which ethyl cellulose had previously been added as a binding agent and is subsequently treated on a three-roll mill so that a highly viscous, free-flowing paste was created.

The paste was applied to the webs of an interconnector by a thick-film technique such as screen printing or mask printing or roll coating. However, the complete coating of the interconnector is advantageous in which the webs and gas channels and the cathode are coated by the MEA. The thickness of the layer should be approximately 20-200 µm after the coating.

After the drying of the layer, the prepared interconnector plates and the cathodes of fuel cells coated with glass solder (glass ceramic material) at the edge were alternately put together with the respective anodes to form a stack.

After the insertion onto a metal plate with a gas supply device, this stack was heated to 800-950° C., preferably 850° C., for 2 to 6 hours and was then ready for use. This can be achieved in the normal first operation of a high-temperature fuel cell.

Figure 1:
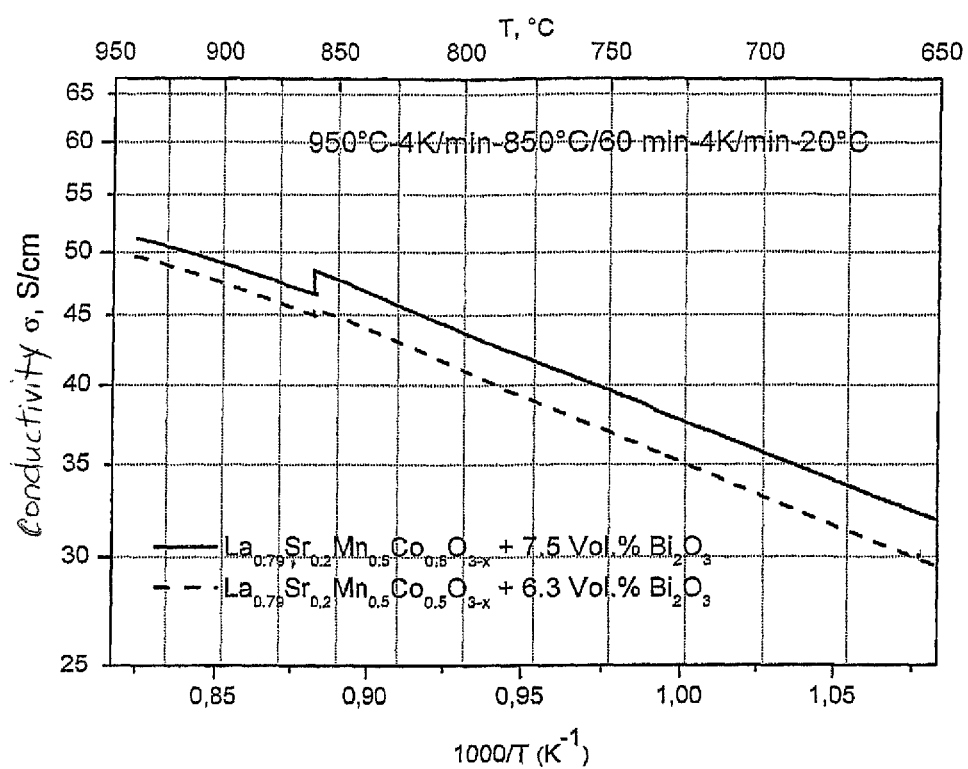
FIG. 1 a diagram with the temperature-dependent electric conductivity of materials for functional layers in accordance with the invention which have been exposed to a heat treatment at a screen-printed functional layer at 850° C. with a holding time of 60 min.

The change in the electric conductivity in dependence on the temperature is illustrated by FIG. 1 for compounds which were manufactured in accordance with the embodiment.

Figure 2:
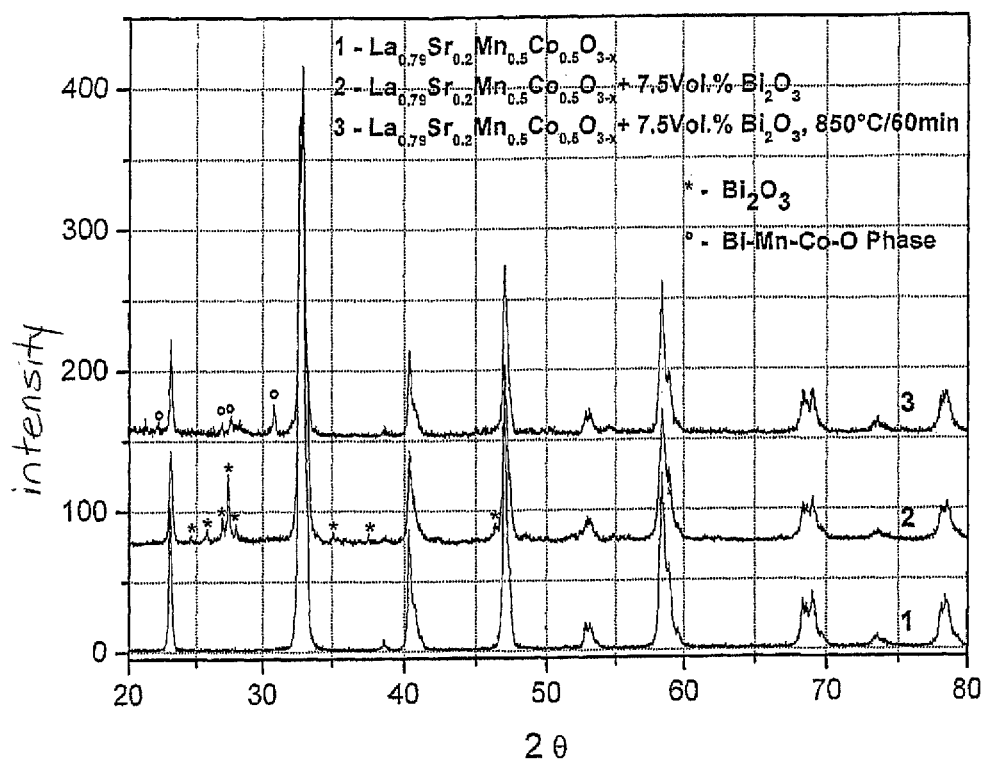
FIG. 2 X-ray diffractograms for $La_{0.79}Sr_{0.2}Mn_{0.5}Co_{0.5}O_{3-x}$, $La_{0.79}Sr_{0.2}Mn_{0.5}Co_{0.5}O_{3-x}+Bi_2O_3$ mixtures before and after a heat treatment of one hour at 850° C.

It becomes clear by the X-ray diffractograms shown in FIG. 2 that the material in accordance with the invention for the functional layer of the mixture of $La_{0.79}Sr_{0.2}Mn_{0.5}Co_{0.5}O_{3-x}$ and $Bi_2O_3$ sintered at 850° C. is a material which has at least two phases.

Figure 3:
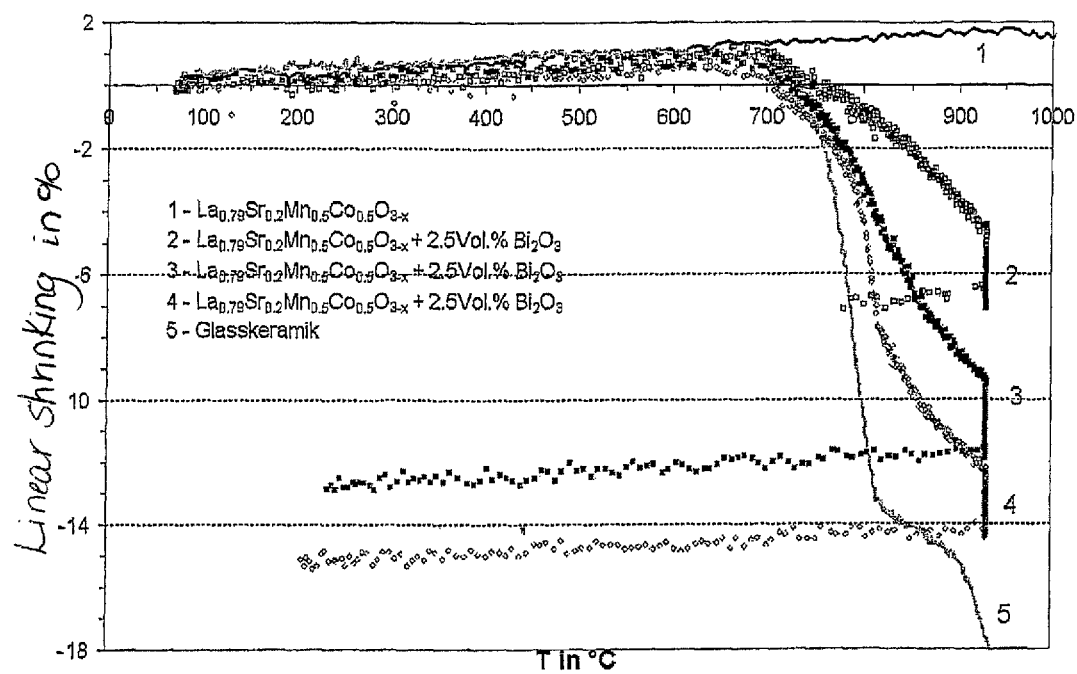
FIG. 3 the linear shrinkage behavior up to 930° C. of materials usable for the functional layer and of a glass ceramic material.

In the diagram shown in FIG. 3, the shrinkage of $La_{0.79}Sr_{0.2}Mn_{0.5}Co_{0.5}O_{3-x}+Bi_2O_3$ with different ratios of $La_{0.79}Sr_{0.2}Mn_{0.5}Co_{0.5}O_{3-x}$ and $Bi_2O_3$ is set forth in comparison with glass ceramic material in the temperature range from 0 to 930° C. and it becomes clear that only slight differences in the final shrinkage of these materials are also present at the operating temperature so that they can be used without problem in combination with one another even with high-temperature fuel cells. By varying the corresponding ratios of $La_{0.79}Sr_{0.2}Mn_{0.5}Co_{0.5}O_{3-x}$ and $Bi_2O_3$ and of the temperature profile in the heat treatment, the shrinkage of the functional layer can be optimized with respect to the shrinkage of the glass ceramic material. The manufacturing effort can thus be reduced and inherent tensions at high-temperature fuel cells can be avoided at all temperatures which occur.

Figure 4:
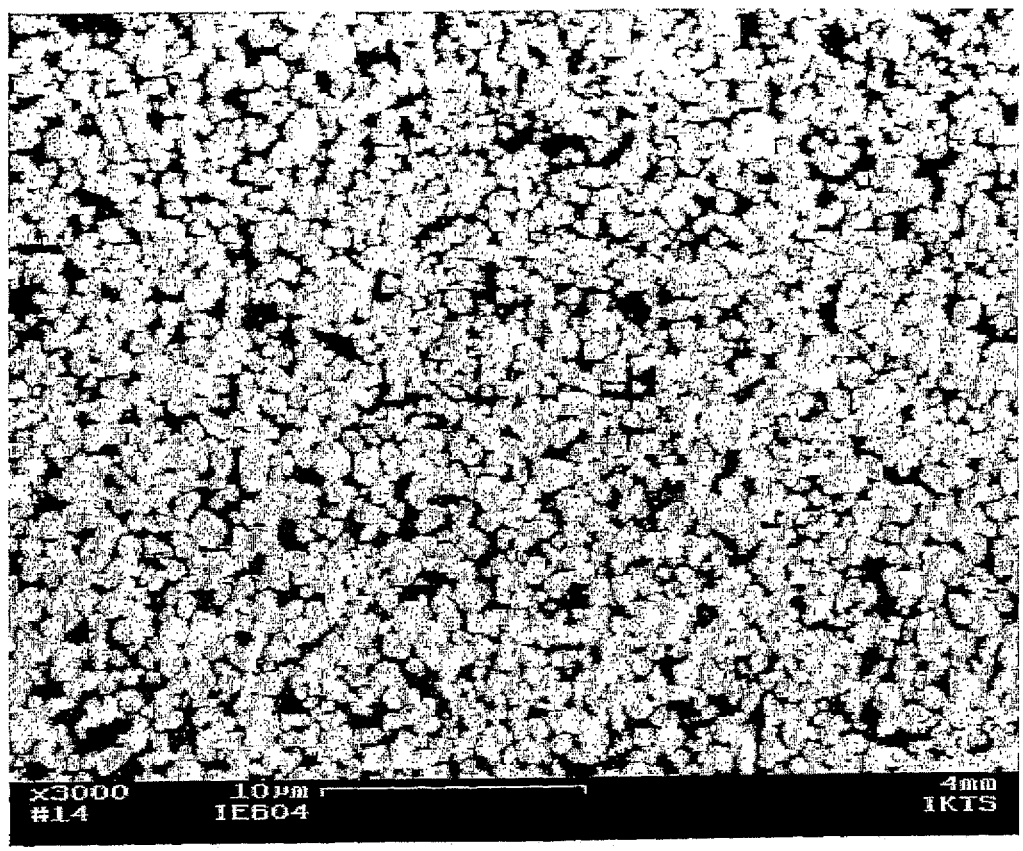
FIG. 4 structure of a screen-printed functional layer after sintering at 930° C. and after operation in a high-temperature fuel cell stack at 850° C.

The morphology of a screen-printed functional layer which was formed after sintering at 930° C. and after operation in a high-temperature fuel cell stack at 850° C. is shown in FIG. 4. The individual perovskite particles are already sintered very well to one another at the operating temperature of high-temperature fuel cells and form a stable network with high electric conductivity.

The invention claimed is:

1. A functional layer for a high-temperature fuel cell, comprising:
   a material comprising at least two phases, a first phase of the at least two phases being a perovskite ceramic material containing bismuth-cobalt, a second phase of the at least two phases being at least one of a bismuth manganite and bismuth cobaltite,
   wherein the layer is arranged between an interconnector and a cathode,
   wherein the first phase is formed with a perovskite containing bismuth-cobalt in accordance with the formula $Ln_{1-x-z}Bi_zA_xM_{1-y}Co_yO_{3-\delta}$, where x≤0.35, 0≤z≤0.05, 0.1≤y≤0.6, Ln=rare earths, A=alkaline earth, M=transition metals.

2. The layer of claim 1, wherein the at least two phases are homogeneously distributed in the material.

3. The layer of claim 1, wherein the first phase is contained in the material with a proportion of 90 to 98% by volume and the second phase is contained with a proportion of 2 to 10% by volume.

4. The layer of claim 1, wherein the layer connects the interconnector and the cathode to one another with material continuity.

5. The layer of claim 1, wherein the layer has a thickness of up to 800 µm.

6. The layer of claim 1, wherein the layer has an electric conductivity of at least 10 S/cm at temperatures above 700° C.

7. A high-temperature fuel cell, comprising:
   a functional layer arranged between an interconnector and a cathode, the layer comprising a material which has at least two phases, a first phase of the at least two phases being a perovskite ceramic material containing bismuth-cobalt, a second phase of the at least two phases being at least one of a bismuth manganite and bismuth cobaltite,
   wherein the first phase is formed with a perovskite containing bismuth-cobalt in accordance with the formula $Ln_{1-x-z}Bi_zA_xM_{1-yCo_y}O_{3-\delta}$, where x≤23 0.35, 0≤z≤23 0.05, 0.1≤y≤23 0.6, Ln=rare earths, A=alkaline earth, M=transition metals.

* * * * *